July 20, 1965

I. POLLOCK 3,195,543

DISPOSABLE ABSORBENT ELEMENT FOR
DETACHABLE BOWL SMOKERS' PIPES

Filed July 29, 1963

INVENTOR
IVOR POLLOCK
BY
KEMON, PALMER, STEWART &
ESTABROOK. ATTORNEY

United States Patent Office 3,195,543
Patented July 20, 1965

3,195,543
DISPOSABLE ABSORBENT ELEMENT FOR DETACHABLE BOWL SMOKERS' PIPES
Ivor Pollock, London, England, assignor to Falcon Pipes Limited, London, England, a British company
Filed July 29, 1963, Ser. No. 298,225
Claims priority, application Great Britain, Aug. 8, 1962, 30,448/62
4 Claims. (Cl. 131—207)

This invention relates to a disposable absorbent element for detachable bowl smoker's pipe of the type in which the bowl is detachably secured in a bowl holder usually on the end of a pipe-stem and the smoke from the tobacco burning in the bowl may be drawn downwards through an opening in the bowl into a cavity in the bowl holder underneath the bowl and thence passes through the stem.

In use some moisture and combustion products inevitably collect in the bowl holder cavity, necessitating periodic removal of the bowl and cleaning of the bowl holder.

U.S. Patent No. 2,581,169 to Bugg describes and claims detachable bowl pipes in which the bowl holder carries a condensing plug which extends upwardly into the opening in the bowl so that a narrow annular smoke passage is left between it and the bowl opening. The smoke passing over the surface of the condensing plug is cooled and water vapour in the smoke is thereby encouraged to condense in the bowl holder, resulting in a drier and more pleasant "smoke" for the smoker. This increases the necessity for periodically cleaning the bowl holder.

The normal methods of cleaning the bowl holder are wiping with an absorbent tissue or washing under a tap. However, circumstances arise in which it is impossible or undesirable to use either of these methods. It is accordingly an object of this invention to provide a disposable absorbent element which will absorb the condensate in the bowl holder cavity and which can be easily disposed of after use, a fresh element being then fitted in the bowl holder.

According to this invention, a disposable absorbent element for a detachable bowl pipe comprises an absorbent body portion, preferably generally circular in outline, the absorbent material of which is cut away or indented at one portion of its periphery and a locating pin carried by the body portion and extending outwards (in the general plane of the element) beyond the cut away or indented portion of the periphery. In use the element is placed in the bowl holder cavity with the locating pin extending as a very loose fit into the opening of the passage in the pipe stem. The pin keeps the cut away or indented portion in register with the passage opening thereby preventing it from rotating so that there is no risk of the passage opening being blocked as a result of the periphery of the element being drawn against it by suction in the passage.

For use with pipes having condensing plugs, the element has a hollow centre to accommodate the condensing plug.

An embodiment of the invention will now be described by way of example with reference to the accompanying drawings, in which.

Figure 1:
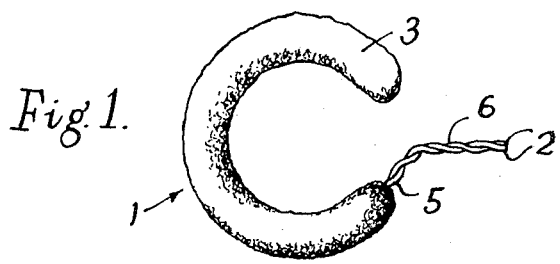
FIG. 1 is a plan of a disposable element according to the invention.

Referring to the drawings, the element 1 is formed from a 1$^{15}/_{16}$" length of material such as is used for making pipe cleaners, consisting of two lengths of fine wire 2 twisted together, an absorbent fibrous textile material such as cotton 3 being clamped between the two wires 2 for the greater part of its length, $^{3}/_{8}$" being left bare at one end. The cotton 3 is sufficiently long and fluffy to cover the wires 2 completely. The covered part of the element is bent into a 320° arc of a circle of diameter slightly greater than half an inch. The first $^{1}/_{16}$" length 5 of the bare portion of the element continues the arc of the covered part and the remainder of the bare part is bent radially outwards to form a locating pin 6 slightly over $^{1}/_{4}$" long.

The element described above is particularly intended for use in a detachable bowl pipe of the kind described in the Bugg patent referred to above.

Figure 2:
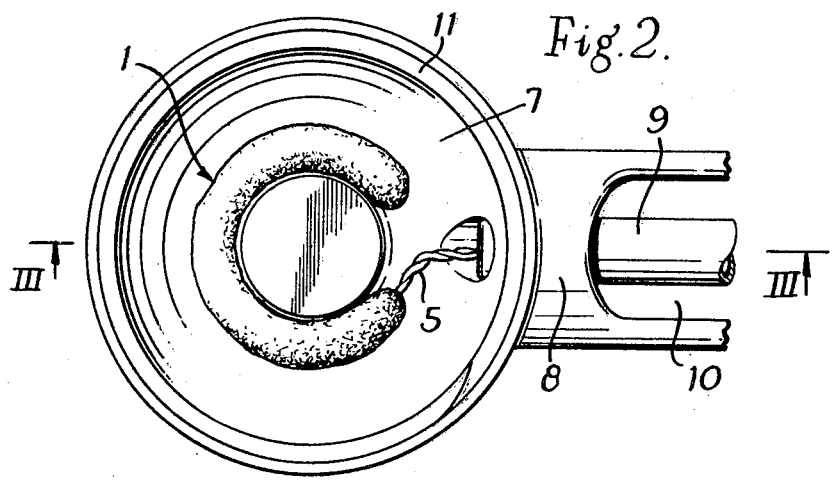
FIG. 2 is a view of part of the bowl holder of a detachable bowl pipe with the element in position but with the pipe bowl removed.
Figure 3:
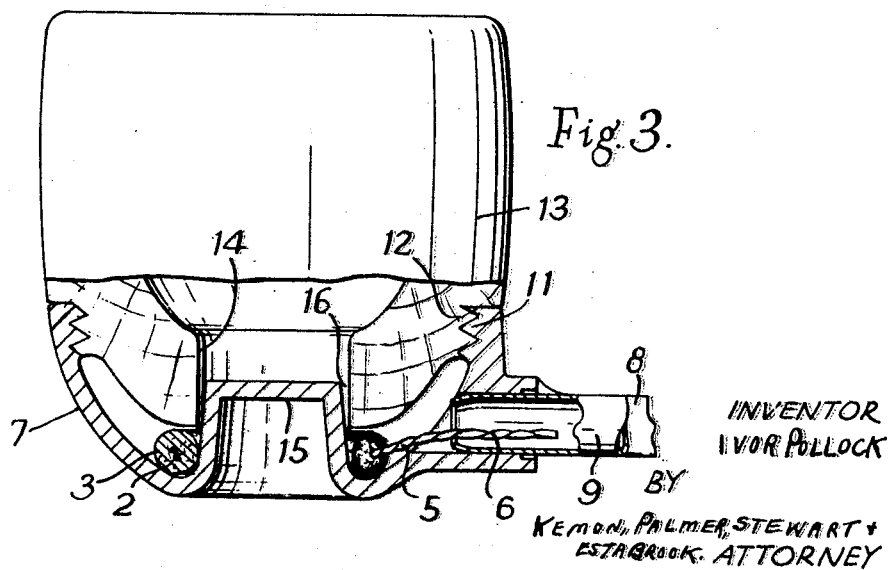
FIG. 3 is a longitudinal sectional view on the line III—III of FIG. 2, with a pipe bowl mounted on the bowl holder.

Referring to FIGS. 2 and 3, the detachable bowl pipe comprises a die-cast aluminium bowl-holder 7 carrying a stem 8 which is cast integral with the bowl holder. At its free end, the stem 8 carries a bit or mouthpiece (not shown). The mouthpiece communicates with the interior of the bowl holder 7 by means of a draw-tube 9 which, for the majority of its length is exposed to the atmosphere for cooling purposes in a slot 10 in the stem 8.

The rim of the bowl holder is internally threaded at 11 to engage corresponding external threads 12 (FIG. 3) on a briar pipe bowl 13.

The bowl 13 has a large cylindrical opening 14 into which projects a hollow condensing plug 15 on the bowl holder to leave a narrow annular smoke passage 16 between it and the wall of the opening 14.

In use, smoke from tobacco in the bowl 13 on its way to the draw tube 9 has to pass very close to the condensing plug 15 in the passage 16. Consequently, the smoke is cooled and moisture and other combustion products tend to collect in the well of the bowl holder around the condensing plug. The absorbent element 1 serves to absorb this condensate.

To insert the element 1 into the pipe, the pipe bowl 13 is unscrewed from the bowl holder 7, the locating pin portion 6 of the element is inserted into the opening of the draw tube 9 and the covered portion 3 of the element is engaged over the condensing plug 15, as shown in FIG. 2.

The absorbent element is replaced by a fresh element whenever necessary.

It will be noted that the absorbent material 3 is in effect cut away in the region of the base of the locating pin 6. This avoids the risk of the entry to the draw tube 9 being blocked by the absorbent element as a result of movement due to suction in the draw tube.

I claim:
1. In a smoker's tobacco pipe having a detachable bowl carried by a bowl holder having a stem, said bowl holder having a condensing plug extending through a hole in said bowl and a draw hole leading from said bowl holder into said stem, a disposable absorbent element comprising:
   an absorbent body portion of generally annular configuration surrounding the condensing plug and defining a cut away portion located in confronting relation with the draw hole;
   and a locating pin carried by said body portion and extending radially therefrom into the draw hole.
2. A disposable absorbent element as defined by claim 1 in which said element comprises a wire core, one end of which forms said locating pin, and the greater part of the length of said core being covered with absorbent material.
3. A disposable absorbent element as defined by claim

2 wherein said wire core includes two wires twisted together and said absorbent material is fibrous and is clamped between said two wires.

4. In a smoker's tobacco pipe having a detachable bowl carried by a bowl holder having a stem, said bowl holder having a condensing plug extending through a hole in the lower portion of said bowl and a draw hole leading from said bowl holder into said stem, a disposable absorbent element comprising:

a plurality of wires twisted together along their lengths to form a core, said core having an arcuate portion at one end thereof arranged around the condensing plug over the greater part of a circle, leaving a gap is said circle in confronting relation with said draw hole, a tangential portion of said core extending into the middle of said gap;

and a radial locating pin portion extending from said tangential portion into the draw hole, said arcuate portion having flocculent material clamped between said wires.

References Cited by the Examiner
UNITED STATES PATENTS

| | | | |
|---|---|---|---|
| 2,231,176 | 2/41 | Ballin | 131—206 X |
| 2,345,676 | 4/44 | Klugherz | 131—202 |
| 2,581,169 | 1/52 | Bugg | 131—184 X |
| 2,931,366 | 4/60 | Siegel | 131—245 |

SAMUEL KOREN, *Primary Examiner.*

JOSEPH S. REICH, *Examiner.*